United States Patent [19]

Clerc et al.

[11] Patent Number: 4,737,777
[45] Date of Patent: Apr. 12, 1988

[54] POLYCHROME MATRIX SCREEN WITHOUT COUPLING BETWEEN THE ROWS AND COLUMNS

[75] Inventors: Jean-Frédéric Clerc, Meylan; Stéphane Renard, Jarrie, both of France

[73] Assignee: Commissariat a l'Energie Atomique, Paris, France

[21] Appl. No.: 766,036

[22] Filed: Aug. 15, 1985

[30] Foreign Application Priority Data

Aug. 16, 1984 [FR] France .................. 84 12837

[51] Int. Cl.$^4$ .............................................. G09G 3/36
[52] U.S. Cl. ........................................ 340/702; 340/701;
340/783; 340/784; 340/805; 350/339 F
[58] Field of Search ............... 340/701, 702, 703, 704,
340/783, 784, 785, 786, 787, 788, 805; 350/333,
339 F

[56] References Cited

U.S. PATENT DOCUMENTS

| | | | |
|---|---|---|---|
| 3,995,942 | 12/1976 | Kawakami et al. | 340/784 |
| 4,041,481 | 8/1977 | Sato | 350/333 |
| 4,470,667 | 9/1984 | Okubo et al. | 350/339 F |
| 4,485,380 | 11/1984 | Soneda et al. | 340/784 |
| 4,600,274 | 7/1986 | Morozumi | 340/784 |
| 4,613,854 | 9/1986 | Holz et al. | 340/805 |

FOREIGN PATENT DOCUMENTS

| | | |
|---|---|---|
| 3234110 | 3/1983 | Fed. Rep. of Germany . |
| 2451082 | 3/1980 | France . |
| 2499741 | 2/1981 | France . |
| 0144524 | 9/1982 | Japan .................. 350/339 F |
| 0017120 | 2/1983 | Japan . |
| 2025676 | 5/1978 | United Kingdom . |

Primary Examiner—Gerald L. Brigance
Assistant Examiner—Jeffery A. Brier
Attorney, Agent, or Firm—Michael N. Meller

[57] ABSTRACT

Each image point $X_{ij}$ of the matrix screen is defined by the intersection between a control row i having at least one electrode and a control column j having an even number of electrodes. In order to eliminate the coupling between the rows and columns, the voltage signals applied to the electrodes of the same control column cancel one another out in groups of two.

2 Claims, 3 Drawing Sheets

POLYCHROME MATRIX SCREEN WITHOUT COUPLING BETWEEN THE ROWS AND COLUMNS

BACKGROUND OF THE INVENTION

The present invention relates to a polychrome matrix screen without coupling between the control rows and columns. It is used in optoelectronics in the construction of liquid crystal polychrome displays used as means for converting electrical information into optical information.

In per se known manner monochrome and polychrome matrix screens comprise a display cell constituted by two transparent insulating walls and a material having a plurality of zones distributed in matrix-like manner and inserted between a first group of electrodes covering one of the two walls and defining p control rows and a second group of electrodes covering the other wall, constituted by parallel conductive strips defining q control columns row i in which i is an integer such that $1 \leq i - p$ and the column j in which j is an integer such that $1 \leq j \leq q$, defining one of the zones of the material and having means making it possible to supply appropriate excitation signals on the rows and columns for exciting an optical property of the material.

Numerous means of this type are known for which the excitation is electrical and which e.g. use as the sensitive material a liquid crystal film. The invention more particularly applies to such means, but in more general terms applies to all means incorporating a material, whereof an optical property can be modified with the aid of an electrical excitation. The material can be a solid, liquid, amorphous or crystalline substance. The optical property can be an opacity, refractive index, transparency, absorption, diffusion, diffraction, convergence, rotary power, birefringence, intensity reflected in a given solid angle, etc.

In polychrome matrix screens, each elementary image point is constituted by several of the zones defined by the intersection of the electrodes, e.g. three aligned zones, each covered by a color filter, e.g. respectively red, green and blue. In each of these image points, the intensity of each of these colors can be independently controlled, which makes it possible to obtain by combination all the tones of the visible spectrum, For example, FIG. 1 shows the structure of a known trichrome or three-color matrix screen. In this screen, each image point $X_{ij}$ is defined by the intersection of the control row i, constituted by a single electrode 2, and the control column j, constituted by three electrodes 4, 6, 8. These electrodes are transparent and are in each case covered by a color filter which, in the drawing, are respectively red, green and blue for electrodes 4, 6 and 8.

A known control process for such a matrix screen consists, e.g. in the case of a liquid crystal cell where excitation is of an electrical nature, of applying to row i a periodic voltage $V_{xi}$ of zero mean value and to the other rows a zero voltage, and of simultaneously applying to each electrode of each control column periodic voltages of mean value zero, of the same duration and frequency as the row voltage $V_{xi}$, but which are phase-displaced with respect thereto by a quantity $\rho_{ij}$. These voltage signals are applied by a row control means 5 for the row electrodes and by a column control means 7 for the column electrodes.

The optical transmission is at a maximum when this phase is 180° and said transmission is zero (extinction) when said phase is 0°. Between these two values, the transmission is attenuated, extinction being greater as the phase approaches 0°.

With this structure and this control process, a uniform background, e.g. red, is obtained in the following way. To each red electrode, i.e. each column electrode covered with a red filter, such as electrode 4, is applied by the column control means 7 a voltage signal having a 180° phase displacement with respect to the row signal supplied by the row control means 5 and to the green and blue electrodes is applied by the column control means 7 a voltage signal in phase with the row signal.

In the case of the display of a uniform background, a majority of the column electrodes are addressed with a given phase displacement. This configuration leads to a coupling between the rows and columns affecting the visual quality of the displayed image.

A description will now be given of the origin of the coupling phenomenon with reference to FIG. 2, which shows the signals applied to the row and column electrodes, as well as the parasitic signals produced. In accordance with the conventional control process,, all the row electrodes are connected to ground, with the exception of the row electrode i, in which $1 \leq i \leq p$, to which is applied a voltage square wave, such as signal a of FIG. 2. A periodic voltage is also simultaneously applied to each column electrode. The phase difference between the row signal a applied to row electrode i and the signal applied to a column electrode determines the optical transmission factor of the liquid crystal volume to the right of the intersection of said row electrode and said column electrode.

This phase displacement is of a random nature. However, to simplify the explanation of this coupling phenomenon, it will be assumed hereinafter that all the signals applied to the column electrodes are either in phase or in phase opposition with the row signal a. These signals respectively carry the references b and e in FIG. 2.

As a result of the capacitive effect, a parasitic voltage signal, such as signal c, appears on the row electrodes connected to ground. The origin of this parasitic signal is as follows. At times t between O and T/2, in which T is the period of the voltage signals applied to the electrodes, the voltages on the electrodes are constant and equal to $+V$ or $-V$. An electric charge $-Q$ appears on a column electrode subject to a voltage $+V$, to the right of said column electrode and a row electrode i connected to ground, whereas an electric charge $+Q$ appears on said row electrode. On a column electrode subject to a voltage $-V$, the electric charge produced will be reversed, as will the electric charge appearing on each of the row electrodes.

The algebraic sum $\Sigma Q$ of the electric charges present on row i is not generally zero. It is only zero if there are the same number of column electrodes subject to a voltage $+V$ as there are column electrodes subject to a voltage $-V$. At times t between T/2 and T, symmetrically there will be a charge $-\Sigma Q$ on row i.

At T/2, there is consequently a supply of $-2\Sigma Q$ electric charges on row i. As the display material is of an insulating nature, these charges are supplied by the row electrode i. Signal c expresses the current constituting this charge transfer. Signal c is in phase with the majority column signal, i.e. it is in phase with signal b if the column signals are preponderantly in phase with signal a and it is in phase with signal e if the majority of the column signals are in phase opposition with signal a. For example, signal c shown in FIG 2 is in phase with signal b.

As a result of the parasitic capacitive effect, the voltage applied to the material at the intersection of an unselected row and a column to which is applied the signal b is not equal to the latter and is instead equal to signal d representing the difference between signals b and c. In the same way, the material at the intersection of an unselected row and whereof the column signal is represented by signal e is subject to a voltage represented by signal f equal to the difference between signals e and c, instead of being subject to a voltage represented by signal e.

However, it is known that the excitation of the material and consequently its optical transmission varies with the square of the voltage, i.e. with the areas D, F, respectively of signals d, f.

This area difference of the signals d and f, from the visual standpoint, leads to a poor uniformity of the image or picture, as well as to streaks on the screen.

According to the prior art, in order to attempt to limit the coupling effect, it has been necessary to use integrated circuits for controlling the rows of electrodes having a very low access time. This solution causes a certain number of problems, because in order to obtain a low access time, the integrated circuit must have a very low resistance in the conductive state $R_{on}$, which requires integrated circuits with a large geometry. Moreover, in order to fully benefit from the limited access times of these control circuits, it is necessary to use very conductive electrodes, whose cost is high, such as $In_2O_3$ or $Zn_2O_3$ electrodes with a thickness of 125 nm and having a resistance of $40\Omega/cm^2$.

The aim of the invention is to eliminate the coupling between the control columns and rows of a polychrome matrix screen. This result is obtained on the one hand through the use of an original structure of the screen and on the other hand by a control process such that the algebraic sum of the control signals of the column electrodes is zero at all times.

The elimination of the coupling between the rows and columns makes it possible to reduce the constraints on the access times of the integrated circuits for controlling the rows of the matrix screen. This makes it possible to reduce the geometry of the circuits and use electrodes which are less conductive consequently have a lower cost price.

SUMMARY OF THE INVENTION

The present invention specifically relates to an electrically controlled polychrome matrix film incorporating a material whose optical characteristic can be modified, said material being inserted between a first group of p parallel control rows and a second group of q parallel control columns, the rows and columns intersecting, an image point $X_{ij}$ of the screen being defined by the region of the material covered by row i, in which i is an integer such that $1 \leq i \leq p$, and by the column j, in which j is an integer such that $1 \leq j \leq q$, said matrix screen also having a row control means and a column control means for applying electrical signals to the control columns and rows for bringing about an excitation of the material suitable for modifying its optical characteristic. This screen is characterized in that the control row has m parallel row electrodes, in which m is an integer such that $m \geq 1$ and in that each control column has n parallel transparent columns, in which n is an even integer such than $n \geq 2$, said column control means supplying electrical signals to the column electrodes, such that in each control column the electrical signals applied to said column electrodes cancel one another out in pairs, each of the m.n zones of an image point formed by the intersection of a row electrode of the control row of said image point and a column electrode of the control column of said image point being covered by a color filter.

In each control column, there is consequently for each column electrode subject to a given electrical signal, a column electrode subject to an opposite electrical signal. It must be ensured that this is not a coupling which, with a given electrode of one control associates in a definitive manner another given electrode of the same control column. The column electrode pairs are not fixed and are instead modified uninterruptedly as a function of the desired color of the image point.

According to a preferred characteristic, the electrical signal supplied by the column control means and applied to the column control electrodes are periodic signals. The electrical signals applied to two matched electrodes are then in phase opposition.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 3:
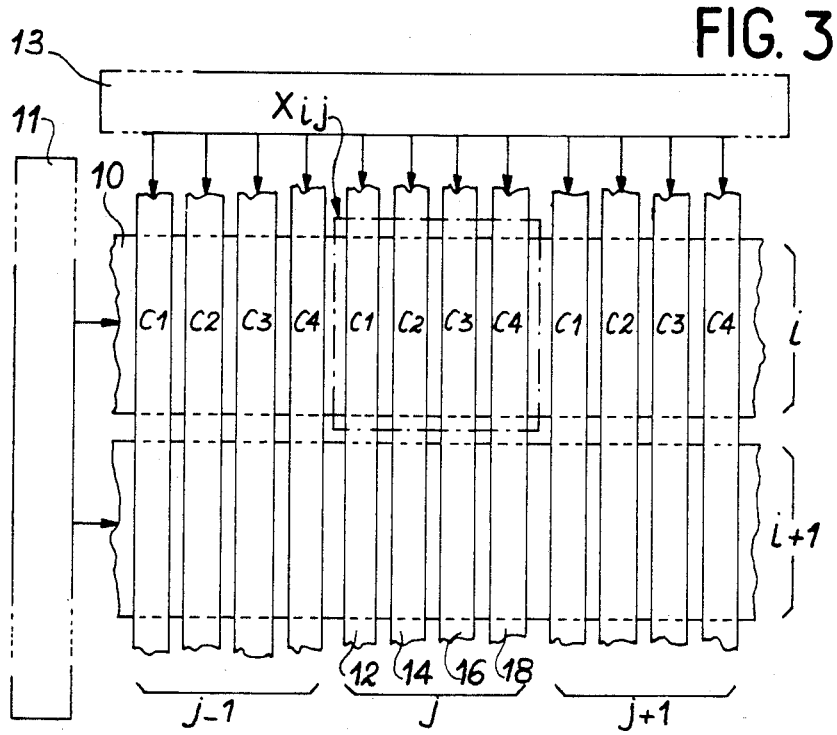
FIG. 3, shows the structure of a polychrome matrix screen according to a first embodiment of the invention.

FIG. 3 illustrates the structure of a polychrome matrix screen according to a first embodiment of the invention. In this screen, each control row i, in which $1 \leq i \leq p$, is constituted by a single electrode 10. Moreover, according to the invention, each control column j, in which $1 \leq j \leq q$, is constituted by an even number of electrodes. In the screen of FIG. 3, each control column comprises four parallel electrodes 12, 14, 16 and 18. These electrodes are transparent and in each case covered by a color filter of respective colors $C_1, C_2, C_3, C_4$. The screen also comprises a row control means 11 and a column control means 13 for applying electric signals respectively to the row electrodes and the column electrodes.

In order to eliminate the coupling between the rows and columns appearing in prior art polychrome matrix screens, according to the invention to the column electrodes by means of the column control means 13 such that within each control column said signals cancel one another out in pairs.

The control process for the polychrome matrix screen according to the invention consists of applying to the two column electrodes of the same pair opposing voltage signals. In the case where the voltage signals are periodic, this is equivalent to the phase-displacing of one of the signals by 180° with respect to the other. The phase displacement value between one of these signals and the voltage signal applied to the row electrode is of a random nature.

The control process of the polychrome matrix screen according to the invention imposes relations between the voltage signals applied to the column electrodes. It is therefore obvious that the hues of the colors which correspond to signals not respecting these relations cannot be obtained.

In particular, it is not possible to select the color $C_1$ of the color filter of electrode 12, because it would be necessary to apply to said electrode a voltage signal phase-displaced by 180° relative to the row voltage signal and to each of the electrodes 14, 16, 18 a voltage signal in phase with the row signal. The column electrodes would then no longer be matched.

This constraint on the signals applied to the column electrodes is not prejudicial because, by a careful choice of the colors $C_1$, $C_2$, $C_3$, $C_4$ of the color filters, by combining these colors it is possible to obtain most of the tones of the visible spectrum. This can be clearly gathered from FIG. 4, which represents the chromaticity diagram XYZ according to the Convention Internationale de l'Eclairage.

This diagram has a curve 20 called the spectrum locus, which is the location of the monochromatic radiations. This curve is represented by visible radiations between 400 and 780 nm. Curve 20 is closed by a so-called pure purple line 22, which represents the location of the colors obtained by extreme red (780 nm) and extreme violet (400 nm) addition of the visible spectrum. Each point of the closed surface defined by curve 20 and straight line 22 corresponds to a particular composite color. For example, the region 24 centered on point G of the coordinates $x = \frac{1}{3}$ and $y = \frac{1}{3}$ represents the color white.

On this diagram is represented, in accordance with an embodiment of the matrix screen, the colors $C_1$, $C_2$, $C_3$, $C_4$ of the color filters. These filters have composite colors whose hues are respectively green, yellow-green, red and violet.

Figure 4:
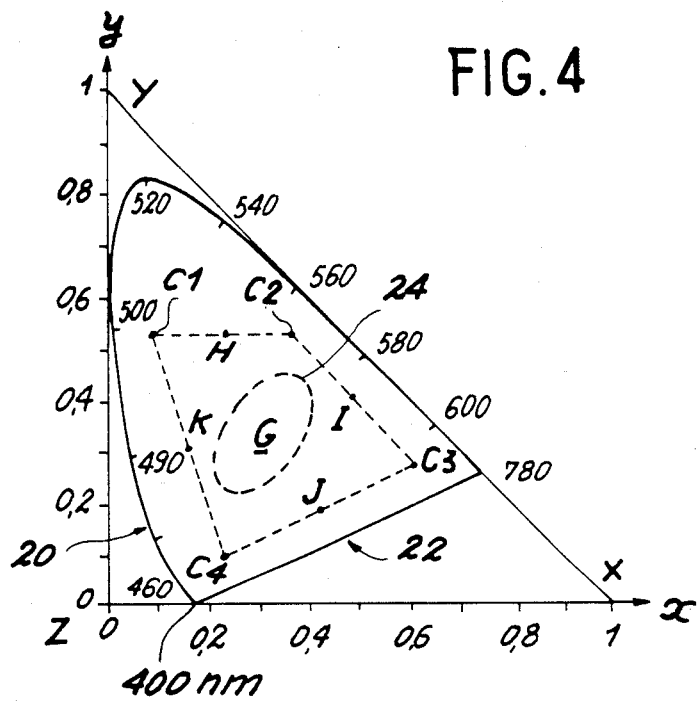
FIG. 4, a graph representing the colors in accordance with the Convention Internationale d'Eclairage.

With the aid of these four color filters and by controlling the matrix screen according to the invention, it is possible to obtain the colors represented by points H, I, J and K in FIG. 4. The hues of these composite colors are respectively green-yellowish, yellow-orange, pink-purple and blue-green. These colors are obtained by applying to the column electrodes the voltage signals indicated in the following table.

TABLE

| Column Electrode Color | Phase between row signal and signal applied to the column electrode | | | |
|---|---|---|---|---|
| $C_1$ | 180° | 180° | 0° | 0° |
| $C_2$ | 180° | 0° | 180° | 0° |
| $C_3$ | 0° | 0° | 180° | 180° |
| $C_4$ | 0° | 180° | 0° | 180° |
| Resulting Composite Color | H | I | J | K |

Figure 1:
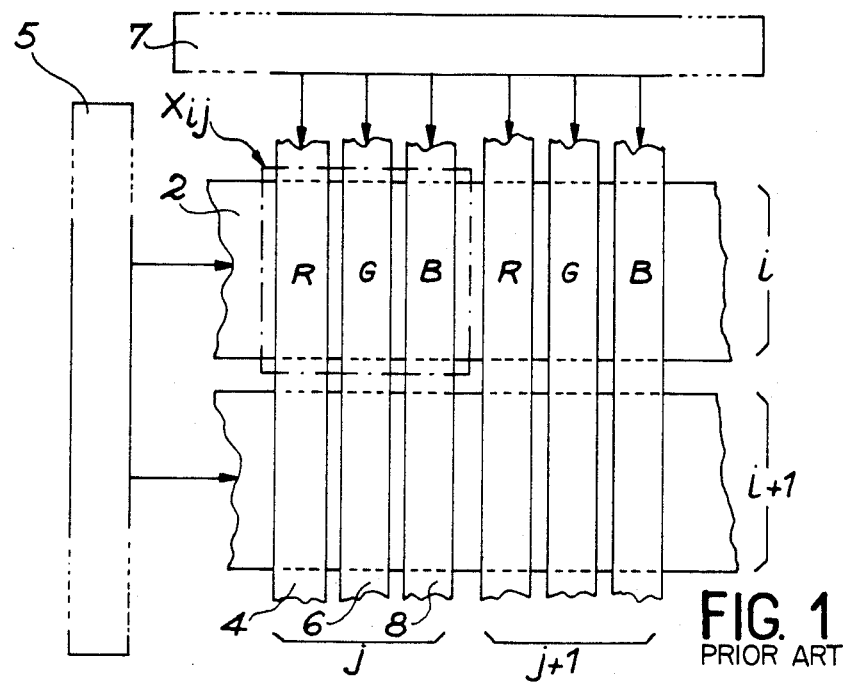
FIG. 1, already described, shows the structure of a prior art polychrome matrix screen.

A mean white (region 24 in FIG. 1) can also be obtained by applying to the column electrodes voltage signals phase-displaced by ±90° relative to the row voltage signal. It is sufficient to address two random column electrodes with a phase displacement of +90° on the row voltage signal and the two other column electrodes with a phase displacement of −90°.

The use of other phase displacements between the column voltage signals and the row voltage signal makes it possible to obtain other colors.

With reference to FIG. 3, a polychrome matrix screen according to the invention is described wherein each image point $X_{ij}$ is constituted by the intersection of a row electrode and four column electrodes. Obviously, this would not constitute a limitation to the invention, which also relates to polychrome matrix screens, since the number of column electrodes for each image point can be equal to 2, 6, 8, etc.

Figure 2:
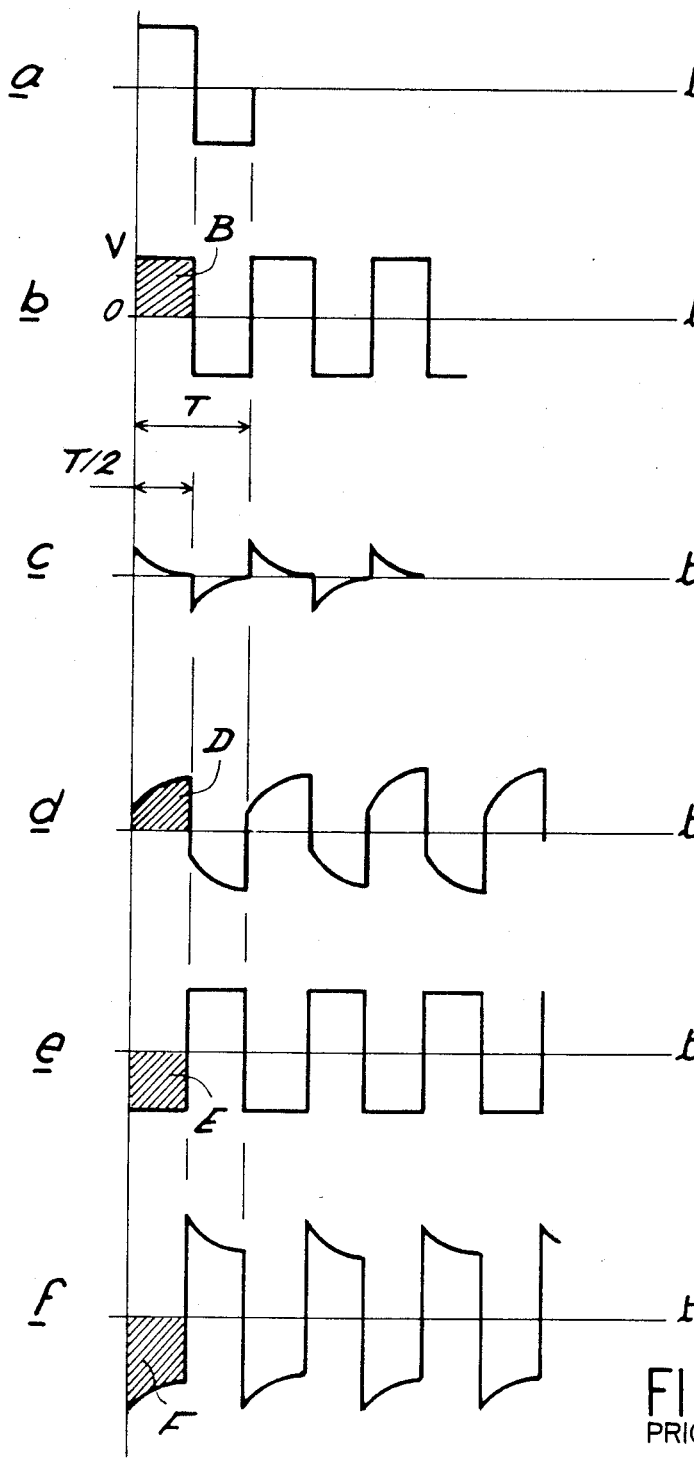
FIG. 2, already described, is a chronogram showing the coupling between the rows and columns in a prior art polychrome matrix screen and the visual faults or defects induced by this coupling.
Figure 5:
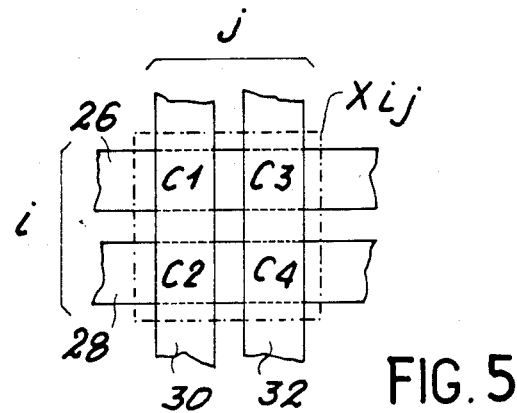
FIG. 5, shows the structure of a polychrome matrix screen according to a second embodiment of the invention.

The invention also covers polychrome matrix screens, whose column electrodes are controlled in accordance with the process of the invention and in which with each image point is associated a plurality of row electrodes. An embodiment of such a polychrome matrix screen is shown in FIG. 5, where each image point $X_{ij}$ is defined by the intersection between the control row i having two row electrodes 26, 28 and the control column j having two column electrodes 30, 32. The intersections between these row electrodes and the column electrodes define regions where it is possible to modify the optical characteristic of the material. Color filters $C_1$, $C_2$, $C_3$ and $C_4$ are located on the column electrodes to the right of each of these regions. Row and column control means identical to those shown and described with reference to FIGS. 1 and 2 complete the matrix screen, an image point of which is shown in FIG. 5. These means are not shown in FIG. 5.

The polychrome matrix screen is controlled in the following way. In a conventional manner, the row electrodes are successively selected, the unselected row electrodes being connected to ground. The control of the column electrodes takes place according to the invention by the application of a voltage signal to one of the two column electrodes and by applying a voltage signal phase-displaced by 180° to the other column electrode.

The following table summarizes the phase displacement to be applied to the signals of column electrodes 30, 32 compared with the signals of the row electrodes 26, 28 for obtaining the composite colors H, I, J and K of FIG. 4.

TABLE

| Selected row electrode reference | Phase of column electrodes 30 and 32 | | | |
|---|---|---|---|---|
| 26 | 180° and 0° | 0° and 180° | 180° and 0° | 0° and 180° |
| 28 | 180° and 0° | 0° and 180° | 0° and 180° | 180° and 0° |
| Resulting composite color | H | K | I | J |

According to the invention, a mean white is obtained by addressing one of the two columns with a phase displacement of +90° relative to the signal of the selected row electrode and the other column electrode with a phase displacement of −90° relative to said row electrode.

The use of different phase displacements between the column electrodes and the row electrodes makes it possible to obtain other colors.

The structure and control process of the polychrome matrix screen according to the invention make it possible to reduce constraints on the access time existing in connection with the prior art screens.

As the coupling between the rows and columns is eliminated, there is no longer any need of having a limited access time. Thus, it is possible to use slower addressing circuits, which are smaller and it is possible to use weakly conductive electrodes having a low cost price, such as $In_2O_3$ or $Zn_2O_3$ electrodes with a thickness of 25 nm and a resistance of $200\Omega/cm^2$.

What is claimed is:

1. An electrically controlled polychrome matrix screen comprising:
   (a) a first group of R parallel row electrodes, in which $R \geqq 1$,
   (b) a second group of C parallel transparent column electrodes, in which C is an even integer, said row electrodes and said column electrodes overlapping,
   (c) a material whose optical characteristic can be modified, said material being inserted between said first group and said second group, an electrically controllable zone of said material being defined by the material covered by the overlap of row k and column l, in which k, l are integers and $1 \leqq k \leqq R$, $1 \leqq l \leqq C$, and
   (d) a row control means and a column control means for respectively applying to the row electrodes and column electrodes electrical signals causing an excitation of the material suitable for modifying its optical characteristic,
   wherein said screen comprises $p \times q$ polychrome image points, each image point $Xij(1 \leqq i \leqq p$ and $1 \leqq j \leqq q)$ being defined as a magtrix of $m \times n$ electrically controllable zones, in which $p \times m = R$ and $q \times n = C$, m being an integer and n being an even integer, each zone of each matrix of $m \times n$ electrically controllable zones being covered by a color filter, and said column control means supplying a separate electrical signal to each column electrode of the n adjacent column electrodes associated with an image point Xij whereby the parasitic effects of said column electrodes on a row electrode cancel each other for pairs of said column electrodes.

2. An electrically controlled polychrome matrix screen according to claim 1, wherein the electrical signals applied to the column electrodes are periodic signals.

* * * * *